(12) United States Patent
Castell Martinez

(10) Patent No.: US 8,332,164 B2
(45) Date of Patent: Dec. 11, 2012

(54) METHOD FOR DETERMINING FATIGUE DAMAGE IN A POWER TRAIN OF A WIND TURBINE

(75) Inventor: Daniel Castell Martinez, Barcelona (ES)

(73) Assignee: Alstom Wind S.L. (ES)

( * ) Notice: Subject to any disclaimer, the term of this patent is extended or adjusted under 35 U.S.C. 154(b) by 336 days.

(21) Appl. No.: 12/739,499

(22) PCT Filed: Oct. 21, 2008

(86) PCT No.: PCT/EP2008/064221
§ 371 (c)(1),
(2), (4) Date: Apr. 23, 2010

(87) PCT Pub. No.: WO2009/053365
PCT Pub. Date: Apr. 30, 2009

(65) Prior Publication Data
US 2010/0310373 A1     Dec. 9, 2010

(30) Foreign Application Priority Data
Oct. 24, 2007    (EP) .................................... 07119225

(51) Int. Cl.
*F03D 11/00*      (2006.01)
(52) U.S. Cl. ......................................................... 702/34
(58) Field of Classification Search ................... 702/34
See application file for complete search history.

(56) References Cited

U.S. PATENT DOCUMENTS

| | | | |
|---|---|---|---|
| 4,160,170 A | 7/1979 | Harner | |
| 6,591,200 B1 | 7/2003 | Cohen | |
| 7,322,794 B2 | 1/2008 | LeMieux | |
| 2006/0070435 A1 | 4/2006 | LeMieux | |

FOREIGN PATENT DOCUMENTS

| | | |
|---|---|---|
| EP | 1612548 | 1/2006 |
| EP | 1646786 | 4/2006 |
| EP | 1674724 | 6/2006 |
| EP | 1760311 | 3/2007 |
| WO | 9966335 | 12/1999 |
| WO | 2005010358 | 8/2006 |

OTHER PUBLICATIONS

Dr. Ing, Wolfgang Reik, Torsional vibrations and transmission noise, Apr. 1986, 39 pages.*
Walther, Eduard: "Taschenbuch technischer Formeln" 1984, Harri Deutsch, Frankfurt/Main.

(Continued)

*Primary Examiner* — Tung S Lau
(74) *Attorney, Agent, or Firm* — Squire Sanders (US) LLP

(57) ABSTRACT

A method for determining the evolution of torque of at least one rotatable shaft and the resulting fatigue damage to different power train components is provided for design and/or maintenance operations in a wind turbine that comprises the steps of determining torque (Tg) at a high speed shaft of the power train; determining moment of inertia (Ig) at the high speed shaft; determining angular acceleration ($\alpha$g) at the high speed shaft; and determining torque (Tr) at the low speed shaft of the power train through the formula Tr=(Tg−Ig $\alpha$g)·i. A rainflow-counting algorithm may be applied to the value of the torque (Tr) at the low speed shaft for determining the number of cycles at ranges of torque for every torque mean value.

14 Claims, 2 Drawing Sheets

OTHER PUBLICATIONS

Michael R Wilkinson et al: "Condition Monitoring of Generators & Other Subassemblies in Wind Turbine Drive Trains" Diagnostics for Electric Machines, Power Electronics and Drives, SDEMPED 2007. IEEE International Symposium on, IEEE, PI, Sep. 1, 2007, ISBN: 978-1-4244-1061-3.

Babara Van Rooijen, "PCT International Search Report—Appl No. P861PC00", Feb. 16, 2009.
Caselitz P et al: "Reduction of Fatigue Loads on Wind Energy Converters by Advanced Control Methods" European Wind Energy Conference, XX, XX, Oct. 1, 1997.

* cited by examiner

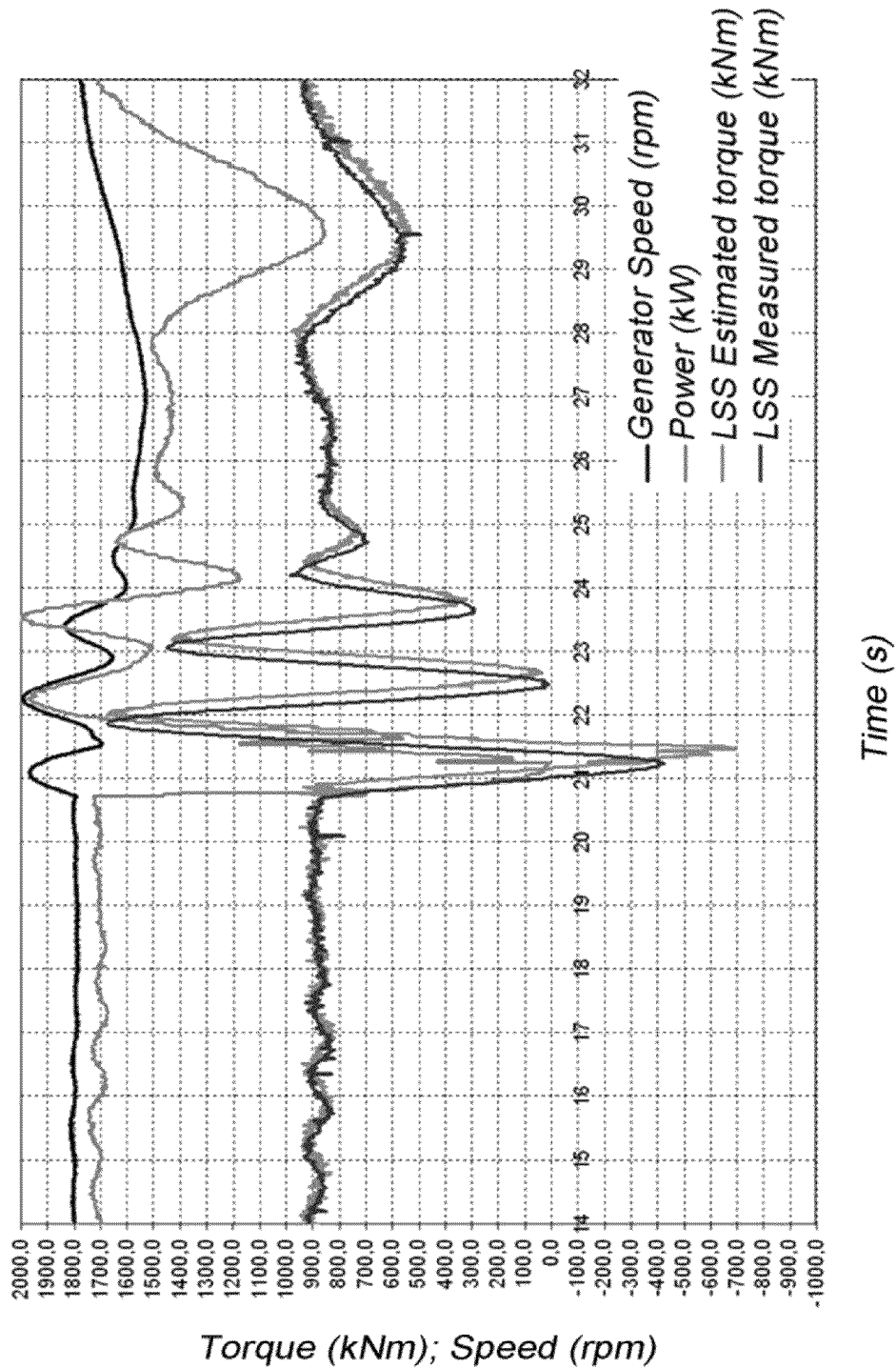

METHOD FOR DETERMINING FATIGUE DAMAGE IN A POWER TRAIN OF A WIND TURBINE

TECHNICAL FIELD

The technical field relates to wind turbines. Specifically, it relates to methods for determining fatigue damage in power trains of wind turbines.

BACKGROUND

A wind turbine power train has to transmit an input torque at a speed from a low speed shaft (associated with rotor and blades) to a high speed shaft (associated with a generator that converts said input torque at a given speed into electric power).

Current wind turbines are fatigue critical machines so it is important to know the value of said input torque at the low speed shaft of the wind turbine power train in order to estimate the fatigue damage for the design of the power train and/or maintenance operations in each wind turbine. This can be carried out by determining the torque oscillations in the power train, particularly in the low speed shaft.

Conventionally, an operating control and data log system may provide accurate values concerning electric power in the generator and angular velocity in the generator (i.e. the high speed shaft). However, input torque values in the rotor (low speed shaft) and angular velocity values in said low speed shaft are difficult to be accurately obtained. Due to this lack of input torque values at the low speed shaft, it is not possible at present to directly and readily obtain the values for the torque to which the wind turbine power train is subjected.

Low speed shaft torque values are typically obtained by experimental methods in combination with mechanical measurements through strain gauge means by directly measuring stress values at the low speed shaft. This is capital intensive, specially taking into consideration the fact that this has to be done for each power train.

SUMMARY

For determining torque value variations at the low speed shaft of the wind turbine power train a rainflow-counting algorithm procedure may be applied. This step of applying a rainflow-counting algorithm to the value of the torque at the low speed shaft may be performed at least for one torque mean value.

The result of this rainflow-counting procedure would be a data matrix including number of cycles for every torque range at every torque mean value. This makes possible to store service measurements in a form suitable for a fatigue analysis of the components in a wind turbine, e.g. fatigue life prediction and simulation testing.

The method may comprise a further step of determining the relationship between the torque and the stress in the material at every point of every component to be analyzed. This relationship may be given by a factor or a non linear equation applied to the torque value to obtain cycles at stress ranges for every mean stress value.

In case the equation is linear it can be simply a factor. In any case the relationship between torque and stress has to be determined by an analytical calculation or by finite element method (FEM) taking into account the geometry and material of the component being analyzed.

Alternatively, said further step may be carried out relative to strain values instead of stress values so that the equation giving the relationship between the torque and the strain in the material at every point of every component to be analyzed can be determined. In case the equation is linear it can be simply a factor. In any case the relationship between torque and strain is determined by analytical calculation or by FEM.

Torque value variations can be then transformed into stress or strain variations by applying the corresponding equation to the torque values, i.e. a stress range–mean stress value matrix or strain range–mean strain value matrix is made available for every component analysis point.

The method may also comprise a further step consisting in determining the accumulated fatigue damage during a period of time in any of the parts of the power train by comparing the number of cycles performed with a predetermined limit established by an SN (stress/number of cycles) curve for each stress range.

Alternatively the method can be carried out using strain values. In that case number of cycles performed would be compared with a predetermined limit established by an $\epsilon N$ (strain/number of cycles) curve for each strain range. This can be preferably carried out by applying the Miner's rule for assessing the fatigue life of the wind turbine subject to complex loading. This rule is applied by comparing for each stress or strain range the number of cycles undergone by the system with the limit established by an SN/$\epsilon N$ curve. The SN curves can be defined by different methods (Leitfaden, FKM or SWL99). SN and $\epsilon N$ curves can be obtained by experimental methods. In any case, the curve will be varied according the average stress/strain. The average stress or strain value is obtained from the above defined matrix.

When accumulated fatigue damage during a period of time exceeds a predetermined value a warning signal can be sent according to a further step of the method in one embodiment thereof.

Through the method disclosed, it is possible to determine the evolution in time of the torque level to which the wind turbine power train is subjected and how this affects in fatigue of the materials forming their components.

BRIEF DESCRIPTION OF THE DRAWINGS

Disclosed embodiments are illustrated by way of example, and not by way of limitation, in the figures of the accompanying drawings.

FIG. 2 illustrates a graph of time versus torque resulting from an example in which speed and power of the generator as well as estimated and measured torque at the low speed shaft is shown.

DETAILED DESCRIPTION OF PARTICULAR EMBODIMENTS

Figure 1:
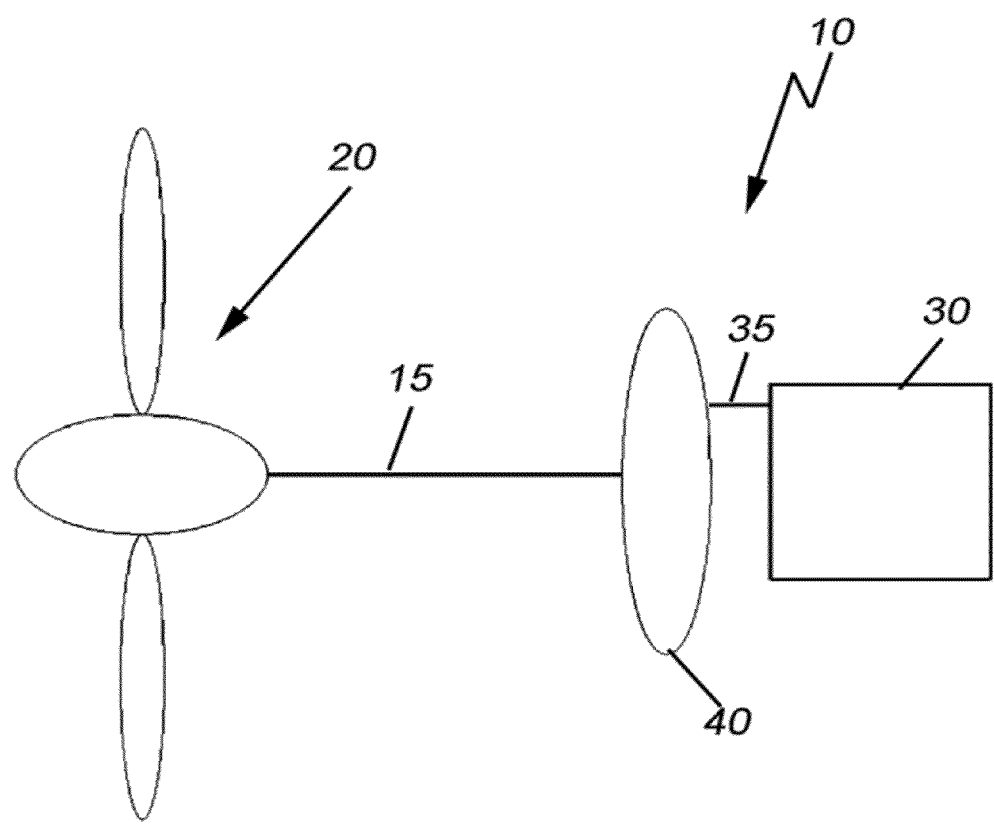
FIG. 1 illustrates is a diagrammatic view of a wind turbine power train.

Disclosed embodiments include methods to estimate the fatigue damage due to torque oscillations in the wind turbine power train from the electric torque and the angular velocity at the wind turbine generator.

By knowing this value of fatigue damage in each of the wind turbine, measures can be taken regarding key parts in the wind turbine (shafts, gears, bearings, etc) before they become broken causing much more costly damages than replacing a part before its breakage. The method provides a possibility of knowing at all times the state of the parts in the power train of the wind turbine.

Embodiments of the method disclosed make it possible to determine for each wind turbine whether it is necessary to replace some parts when design fatigue limit has been exceeded so that it is possible to carry out suitable operations of maintenance.

In addition, the method further permits design hypotheses to be validated referred to produced fatigue loads through software simulation and which have been taken into account in the design of the parts. This validation is usually carried out by means of a series of measurements in a prototype machine. The method disclosed permits to such validation to be carried out from available values causing fatigue.

Disclosed embodiments make it possible to precisely assess torque oscillations in the low speed shaft of the wind turbine rotor. Having this low speed shaft torque value together with the fatigue behaviour of the material of the component being analyzed, as well as the annual wind speed distribution, then the fatigue damage can be accurately known and consequently service lifetime of the wind turbine.

A wind turbine power train denoted as a whole with reference numeral 10 is diagrammatically shown in FIG. 1. Power train 10 serves the purpose of transmitting the input torque Tr from a low speed shaft 15 of the rotor 20 to a high speed shaft 35 in the generator 30 of the wind turbine through a gearbox 40 such that input torque Tr is converted into electric power. The angular velocity $\omega r$ of the low speed shaft 15 and the angular velocity $\omega g$ of the high speed shaft 35 are related by a speed ratio i.

According to one embodiment, the method allows fatigue damage to be accurately assessed by determining the oscillations in the input torque Tr at a given angular velocity $\omega r$ of the wind turbine rotor 20. Assessment of fatigue damage will be useful for design and/or maintenance operations in the wind turbine.

Torque value Tr at the rotor 20 is first determined from values at the generator, that is torque Tg, moment of inertia Ig, and angular velocity $\omega g$. Said values are available directly from the main power supply of the generator 30, that is, at the high speed shaft 35.

Then angular acceleration $\omega g$ at the high speed shaft 35 can be then obtained through the time-derivative of the angular velocity $\omega g$ at the high speed shaft 35.

In a steady production state of the wind turbine the aerodynamic torque is compensated exactly for the sum of the electric torque Tg at the generator plus the frictional losses at the power train 10 and therefore $Tr=Tg \cdot i + Tp$ with Tp being the frictional loss torque. In contrast, in transients in which torque and velocity oscillations exist, that is, the usual operating mode, other forces take place such as the inertial force of the generator, a damping load that depends upon velocity, and a more or less constant torque that represents the frictional losses and which are to be added to the electric torque for obtaining the mechanical torque at the rotor 20 of the wind turbine.

Making said forces at the generator 30 and the rotor 20 respectively equal, $(Tg-Ig \cdot \alpha g) \cdot i = (Tr - Ir \cdot \alpha r)$. Due to the high rotor inertia ($Ir \gg Ig$) it is assumed that changes in velocity at the generator are much faster and more influential than in case of the rotor and therefore it is assumed that $\alpha r \approx 0$ so that the equation will be $Tr=(Tg-Ig \cdot \alpha g) \cdot i$.

Once torque value Tr at the low speed shaft 15 is obtained through the above formula, a rainflow-counting algorithm procedure can be applied in order to assess variations in said torque value Tr. Data obtained through the rainflow-counting algorithm procedure can be in the form of a data matrix (such as a Markov's matrix), including the number of torque cycles for every torque range at every mean torque.

This rainflow counting matrix must be stored and updated every certain period of time, adding the new torque cycles to the previous ones in order to know the total number of cycles that have been applied to the power train. Having that, it is possible to obtain anytime a matrix that is representative of the fatigue loads applied to the system during its working life.

In order to determine fatigue of every component, the relationship between the torque and the stress at every point of every component that is needed has to be calculated whether by analytical calculation or by finite element methods. This calculation has to take into account the geometry of the part and the mechanical characteristics of the material from which said part is made. This relationship can be as simple as a unitary factor (linear relationship) or any non linear equation that relates the torque with local stress or strain. Said factor or non linear equation is previously obtained whether by an analytical calculation or by finite element method (FEM).

Then the damage produced to the power train components by the torque cycles can be calculated. Particularly, this is carried out by comparing the sum of the cycles of all of the data obtained through the rainflow-counting algorithm procedure including stress or strain cycle values at different ranges and with different cycle mean value levels to SN/$\epsilon$N curves of the corresponding materials of the components being analyzed.

A further step of the method may exist consisting in determining accumulated fatigue damage during a period of time in any of the parts of the power train 10 by comparing the number of cycles performed with a predetermined limit for a SN curve for each load range, for example by applying the Miner's rule.

A warning signal may be sent to a control unit when accumulated fatigue damage during a period of time exceeds a predetermined value for being able to investigate about what it has happened on a wind turbine or a wind farm so that appropriate measures can be taken accordingly.

For validating this model an actual data example is now described according to FIG. 2 relating to several voltage drop tests.

In this example it can be seen both an operation segment and a strong event such a voltage drop and the machine recovery after such voltage drop. These data include torque Tr at the low speed shaft 15 taken by means of strain gauges.

As shown in the graph of FIG. 2, the curve obtained by the estimator follows the real values with a high degree of accuracy.

A constant delay is observed on the estimated torque value due to the calculation of the angular acceleration $\alpha g$ at the high speed shaft 35 (the generator 30). First, time-derivative of the angular velocity $\omega g$ at the high speed shaft 35 is calculated and noise at high frequencies in the obtained signal is to be removed. A filter is applied that provides a sharper but somewhat delayed signal. This is not a problem to the aim of the present method which is to obtain the most approximated data to reality for monitoring fatigue in the wind turbine power train.

On the other hand, in the first steeper drop of torque caused to voltage drop the estimated torque lowers even more that the actual torque value. This effect is because in that time interval the machine recovery is being produced and therefore there is a transient in the electric system that introduces sudden variations in the generated power. These variations introduce a disadjustment in the calculation that is hardly to overcome, although the result is a greater absolute value of the torque and therefore conservative for the calculation of the fatigue. As shown immediately after the calculation torque oscillation again reliably follows.

According to one embodiment, the method can be suitably implemented in each of the wind turbines or at least in one representative wind turbine in each wind farm, whereby the accumulated damage for specific loads in each wind turbine or wind farm can be monitored. This is feasible since the method makes use of two parameters for calculation, that is, the electric torque at the generator (available from the generated electric power) and the angular velocity ωg at the generator.

Basic and usual data recorded for other variables are maximum, minimum and average values for each time interval (e.g. 10 minutes). However, these data are not enough for setting out the fatigue damage undergone by the wind turbine power train. So, in order to assess the fatigue damage the method makes use of the above mentioned rainflow counting algorithm procedure through which load cycle values can be obtained at different ranges and with different cycle mean value. This can be carried out for example by a 64×64 data matrix.

These data may be passed once a week so that damage accumulation can be performed on a monitoring and recording data system. Data in the form of a table would be stored, e.g. in a database of the recording data system. Thus, the sum of the cycles of all the matrices that the wind turbine has been passing over its working life will be the cycles to be compared to SN/εN curves corresponding to the material of the component about which the remaining life is desired to ascertain. An accumulated cycle matrix is therefore constructed.

Other embodiments could make use of a Leitfaden SN curve synthesis algorithm, as stated above, or previously defining the curves and introducing their parameters in a matrix form.

Conventionally, an operating control and data log system may provide accurate values concerning electric power in the generator and angular velocity in the generator (i.e. the high speed shaft). However, input torque values in the rotor (low speed shaft) and angular velocity values in said low speed shaft are difficult to be accurately obtained. Due to this lack of input torque values at the low speed shaft, it is not possible at present to directly and readily obtain the values for the torque to which the wind turbine power train is subjected.

Low speed shaft torque values are typically obtained by experimental methods in combination with mechanical measurements through strain gauge means by directly measuring stress values at the low speed shaft. This is capital intensive, specially taking into consideration the fact that this has to be done for each power train.

While particular embodiments and examples have been described, it is understood that, after learning the teachings contained in this disclosure, modifications and generalizations will be apparent to those skilled in the art without departing from the spirit of the disclosed embodiments.

The invention claimed is:

1. A method for determining the evolution of torque of at least one rotatable shaft and a resulting fatigue damage to different power train components, for design and maintenance operations in a wind turbine, said power train comprising a high speed shaft and a low speed shaft whose speeds of rotation ($\omega r$, $\omega g$) are related by a speed ratio (i), characterized in that said method comprises the steps of:
   determining from the generator a torque (Tg) at a high speed shaft;
   determining a moment of inertia (Ig) at a high speed shaft;
   determining an angular acceleration ($\alpha g$) at a high speed shaft; and
   determining a torque (Tr) at a low speed shaft in the generator through the formula:

$$Tr=(Tg-Ig\cdot\alpha g)\cdot i.$$

2. The method of claim 1, wherein said method further comprises a step of applying a rainflow-counting algorithm to the value of the torque (Tr) at the low speed shaft for determining a number of cycles at ranges of torque for every torque mean value.

3. The method of claim 2, wherein said step of applying a rainflow-counting algorithm to the value of the torque (Tr) at the low speed shaft is performed at least for one torque mean value.

4. The method of claim 1, wherein said method further includes a step of determining a relationship between the torque and a stress in a material at every point of every component to be analyzed.

5. The method of claim 4, wherein said relationship is given by a factor or a non linear equation applied to the torque value (Tr) to obtain cycles at stress ranges for every mean stress value.

6. The method of claim 1, wherein said method further includes a step of determining the relationship between the torque and a strain in a material at every point of every component to be analyzed.

7. The method of claim 6, wherein said relationship is given by a factor or a non linear equation applied to the torque value (Tr) to obtain cycles at strain ranges for every mean strain value.

8. The method of claim 4, wherein said method comprises a further step of determining accumulated fatigue damage during a period of time in any of the parts of the power train by comparing a number of cycles performed at every stress range with a corresponding SN (stress/number of cycles) curve for a mean stress value and a material of the component being calculated, and summing all the obtained damages.

9. The method of claim 6, wherein said method comprises a further step of determining accumulated fatigue damage during a period of time in any of the parts of the power train by comparing a number of cycles performed at every strain range with a corresponding εN (strain/number of cycles) curve for a mean strain value and a material of a component being calculated, and summing all the obtained damages.

10. The method of claim 8, wherein said step of determining accumulated fatigue damage during a period of time is carried out by applying the Miner's rule.

11. The method of claim 1, wherein said method comprises a further step of sending a warning signal when accumulated fatigue damage during a period of time exceeds a predetermined value.

12. The method of claim 1, wherein said step of determining the angular acceleration at the high speed shaft ($\alpha g$) is carried out through a time-derivative of the angular velocity ($\omega g$) at the high speed shaft.

13. The method of claim 2, wherein said data obtained through the rainflow-counting algorithm is in the form of a data matrix.

14. The method of claim 9, wherein said step of determining accumulated fatigue damage during a period of time is carried out by applying the Miner's rule.

* * * * *